M. H. MARCUS.
APPARATUS FOR MAKING SANITARY NAPKINS.
APPLICATION FILED APR. 28, 1910.
1,038,493.
Patented Sept. 10, 1912.
5 SHEETS—SHEET 1.
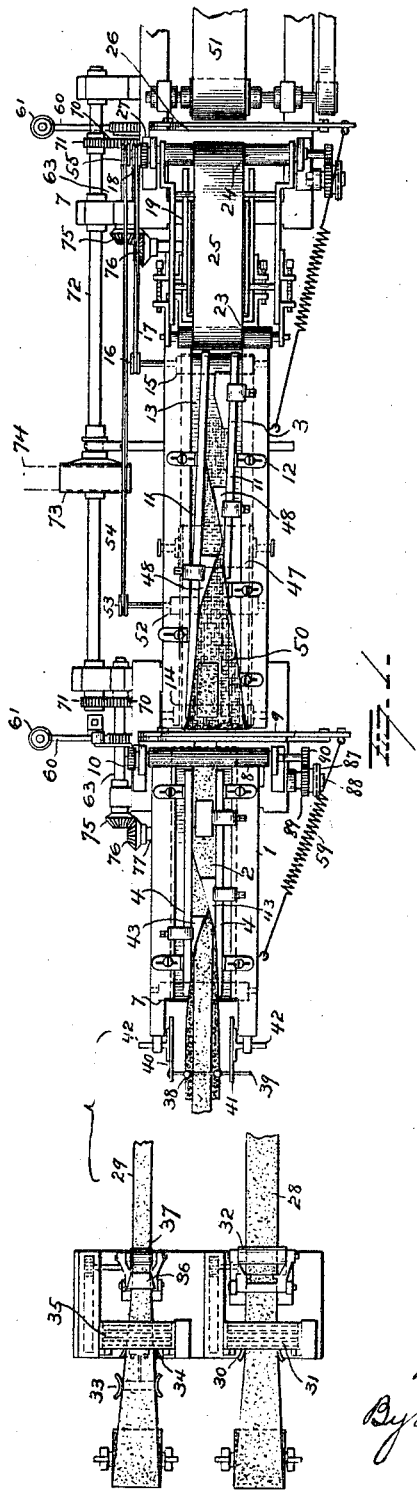
WITNESSES
INVENTOR
M. H. Marcus
By H. A. Seymour
Attorney

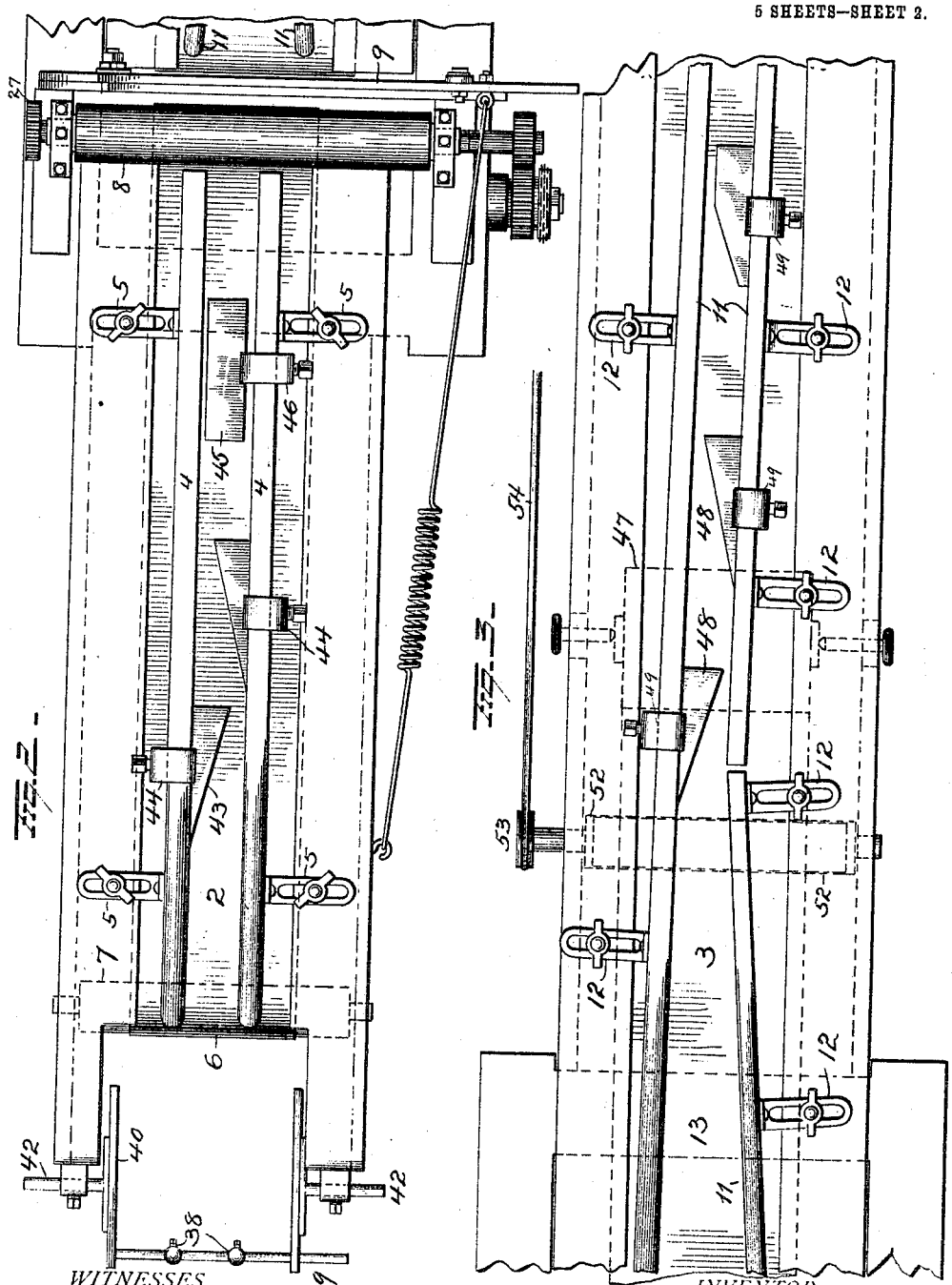

M. H. MARCUS.
APPARATUS FOR MAKING SANITARY NAPKINS.
APPLICATION FILED APR. 28, 1910.
1,038,493.
Patented Sept. 10, 1912.
5 SHEETS—SHEET 3.
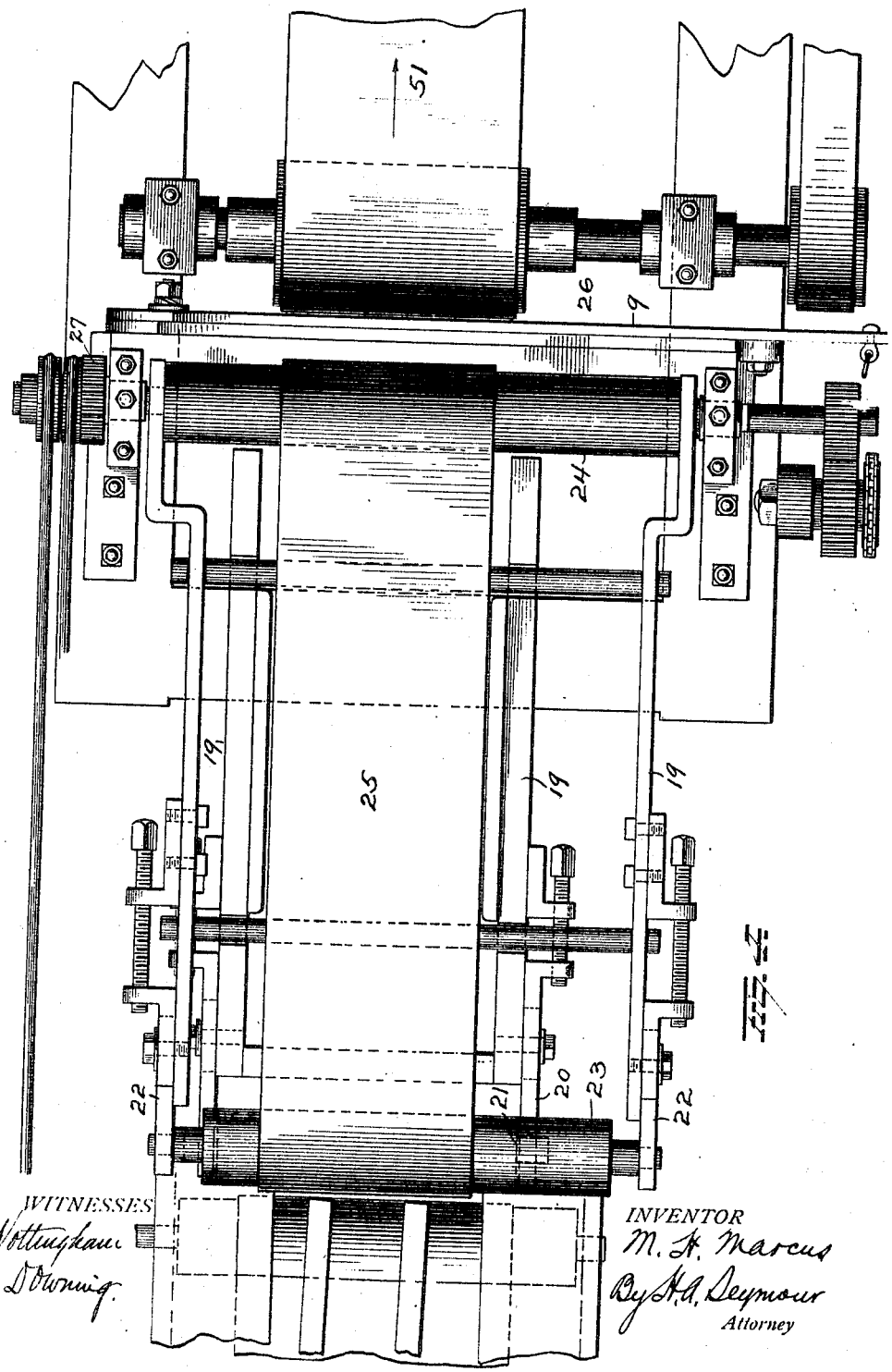

M. H. MARCUS.
APPARATUS FOR MAKING SANITARY NAPKINS.
APPLICATION FILED APR. 28, 1910.
1,038,493.
Patented Sept. 10, 1912.
5 SHEETS—SHEET 4.
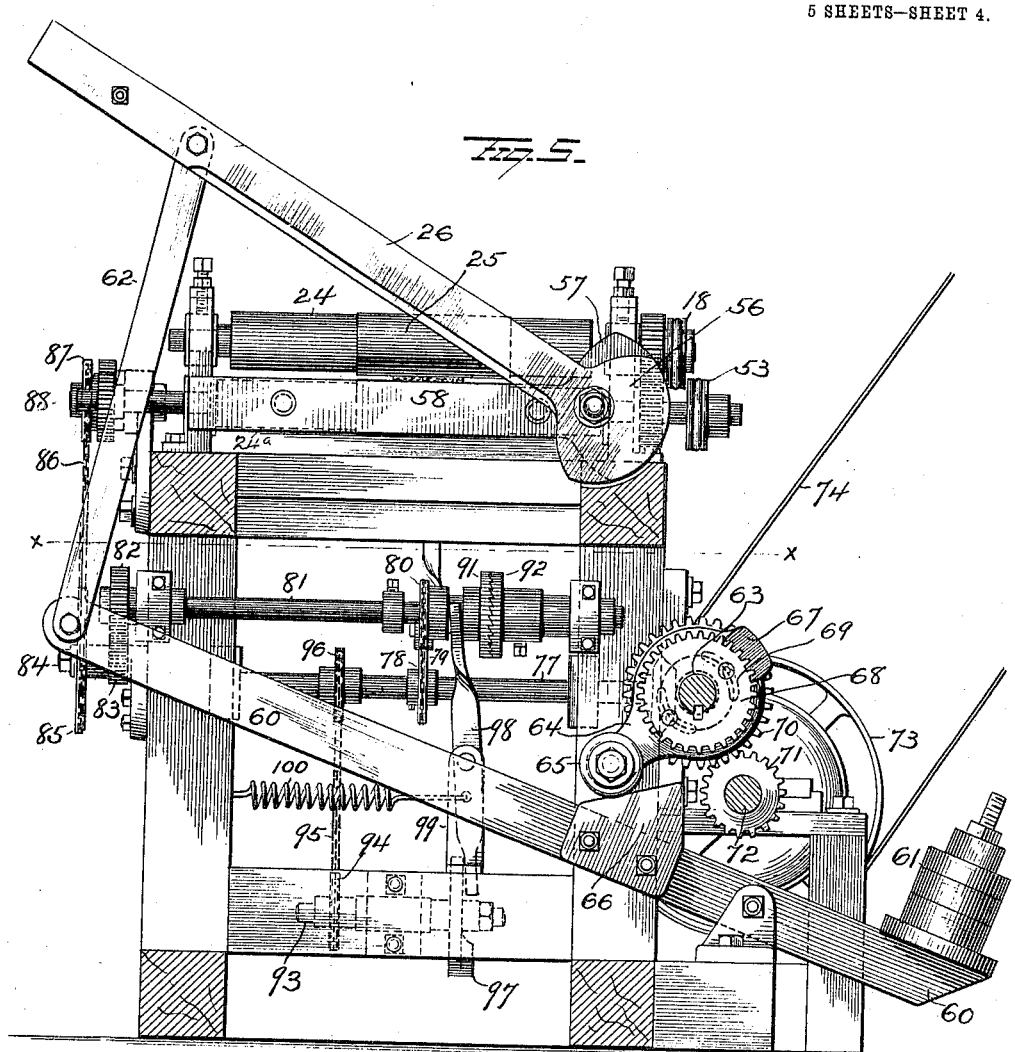
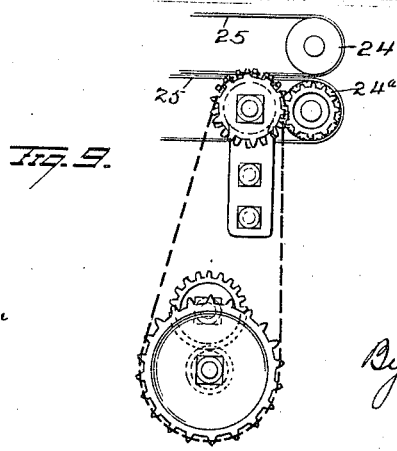

M. H. MARCUS.
APPARATUS FOR MAKING SANITARY NAPKINS.
APPLICATION FILED APR. 28, 1910.
1,038,493.
Patented Sept. 10, 1912.
5 SHEETS—SHEET 5.
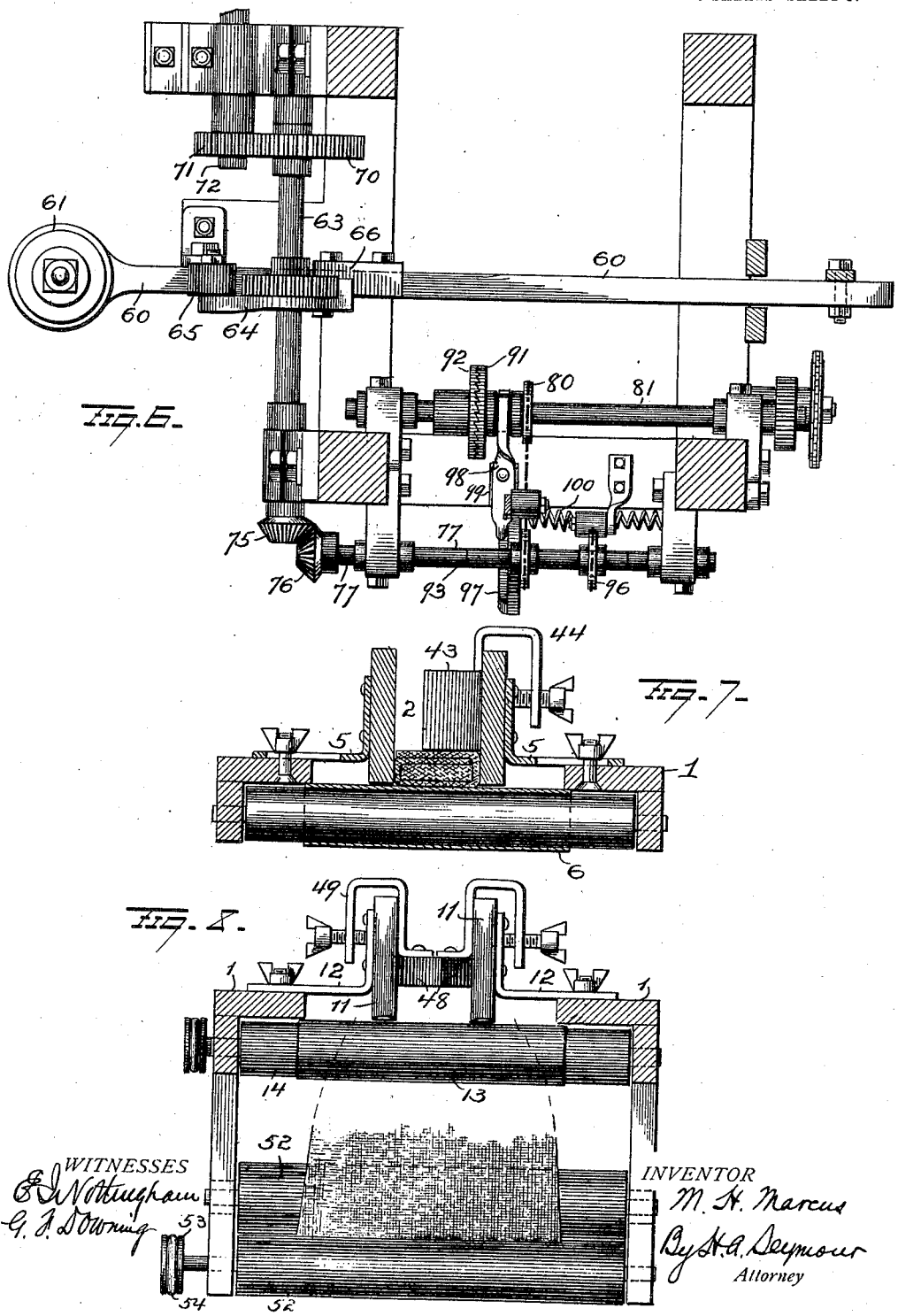

UNITED STATES PATENT OFFICE.

MARTIN H. MARCUS, OF YONKERS, NEW YORK, ASSIGNOR TO JOHNSON & JOHNSON, OF NEW BRUNSWICK, NEW JERSEY, A CORPORATION OF NEW JERSEY.

APPARATUS FOR MAKING SANITARY NAPKINS.

1,038,493.      Specification of Letters Patent.      Patented Sept. 10, 1912.

Application filed April 28, 1910. Serial No. 558,218.

*To all whom it may concern:*

Be it known that I, MARTIN H. MARCUS, of Yonkers, in the county of Westchester and State of New York, have invented certain new and useful Improvements in Apparatus for Making Sanitary Napkins; and I do hereby declare the following to be a full, clear, and exact description of the invention, such as will enable others skilled in the art to which it appertains to make and use the same.

This invention relates to an apparatus for making sanitary napkins or catamenial sacks and the like,—one object of the invention being to so construct the apparatus that the various parts composing the sanitary napkins shall be quickly and accurately assembled from continuous rolls of materials, and cut into proper lengths.

A further object is to construct the apparatus in such manner that it can be readily adjusted for making napkins of different sizes.

A further object is to provide means whereby the width of the napkin can be varied, and also to so construct the apparatus that it can be adjusted to cut the napkins in different lengths.

A further object is to provide an apparatus of the character specified with simple and efficient means for automatically stopping the feeding of the material during the operation of the severing means.

With these objects in view the invention consists in certain novel features of construction and combinations of parts as hereinafter set forth and pointed out in the claims.

In the accompanying drawings, Figure 1 is a plan view of an apparatus embodying my invention. Fig. 2 is an enlarged plan view showing the feeding, folding and severing means for the cotton members of the napkin. Fig. 3 is an enlarged plan view showing the feeding and folding means for the cloth envelop. Fig. 4 is an enlarged plan view showing the discharge end of the apparatus. Fig. 5 is an enlarged sectional view showing the cutter operating devices and the mechanism for automatically stopping the feed during the operation of the cutters. Fig. 6 is a horizontal sectional view on the line *x—x* of Fig. 5. Figs. 7 and 8 are enlarged sectional views showing the guiding and folding devices, and Fig. 9 is a detail view showing portions of the gearing and feeding means.

1 represents suitable framework, in which two chutes or troughs 2—3 are located. The chute or trough 2 comprises parallel bars 4 supported by brackets 5 which are adjustably secured to the framework 1 as clearly shown in Fig. 7 so that said bars can be adjusted relatively to each other to increase or decrease the width of the sheet and consequently the width of the napkin. The bottom of the chute or trough 2 is formed by a traveling belt or apron 6 passing over rollers such as shown at 7, at respective ends of said chute or trough. A roller 8 is mounted in suitable brackets directly over the roller 7 at the forward end of the chute or trough 2 and serves, in coöperation with the said roller 7 and the apron 6 to feed material past the trough 2 and a cutter 9. One journal of the roller 8 is provided with a pinion 10 which meshes with and transmits motion to a similar pinion on the roller 7 below said roller 8 and motion is imparted to the roller 8 for operating the same and the apron 6 in a manner hereinafter described.

The chute or trough 3 is similar in construction to the chute or trough 2 and comprises bars 11 spaced apart to form the sides of said chute and adjustably connected with the framework 1 by means of brackets 12. The bottom of the chute 3 consists of a traveling apron 13 passing over rollers 14—15 at respective ends of said chute,— one journal of the roller 15 being extended and provided with a pulley 16 to receive a belt 17 for operating said traveling apron. The belt 17 receives motion from a pulley 18 secured to the journal of a roller mounted in a frame 19 and located some distance beyond the forward end of the chute or trough 3. This frame carries at its rear end arms 20 adjustably secured thereto, and in these arms, the journals of the roller 21 are mounted as shown in dotted lines Fig. 4. The frame 19 is also provided with arms 22 adjustably secured thereto and receives the journals of a roller 23 disposed directly over the roller 21 and at the forward end of the frame 19 a roller 24 is mounted directly over a roller 24ᵃ at the forward end of the frame 19 as shown in Fig. 9 and in dotted lines in Fig. 5. Thus it will be seen that pairs of superimposed rollers are located at respective ends of the frame 19 and over these rollers two aprons 25 pass and are adapted to receive partially completed napkins from the chute or trough 3 and feed the same forwardly under a cutter 26. One journal of the roller 24 is provided with a pinion 27 which transmits motion to a similar pinion on the roller 24ᵃ beneath the roller 24 and motion is imparted to said roller 24 in a manner hereinafter explained.

In constructing the napkin, two strips of cotton are employed,—one of these strips (indicated at 28 Fig. 1) being absorbent cotton and the other strip 29 being non-absorbent cotton, such as cotton batting. These strips are mounted on rolls and are passed through devices which operate to reduce their width,—the width of the strip 29 being more greatly reduced than that of the strip 28 and the two strips are fed in superimposed positions to the trough or chute 2. After leaving the supply roll the cotton strip 28 passes between reducing guides 30 and rollers 31 so that said strip will be caused to be of a width approximately three times greater than that of the finished napkin. After having been thus reduced in width, the strip will be fed forwardly by means of feed rollers (such as shown at 32) to the inlet end of the chute or trough 2. The cotton strip 29 will be passed through reducing guides 33 and then through or between guides 34 and rolls (such as shown at 35) to further reduce the width of said strip and then the reduced strip will be passed through a conical nozzle 36 which will operate to reduce the width of the strip so that it will be approximately one-third the width of the strip 28 or equal to the width of the finished napkin. From the nozzle 36, the narrow strip of cotton batting or non-absorbent cotton 29 will be fed forward by feed rollers (such as shown at 37 Fig. 1) and superimposed centrally upon the wider absorbent cotton strip 28 and the two strips, thus superimposed will enter the chute 2. In order to insure the proper disposition of the narrow strip 29 centrally upon the wider strip 28, guide pins 38 are employed and carried by a rod 39—said rod being secured at one end to a head 40 and its other end being movably connected with a head 41 and these heads are provided with shanks 42 mounted in suitable brackets on the framework. Beveled folders 43 are located in the trough 2 and supported by brackets 44 adjustably attached to the bars 4 composing the sides of said trough. As the superimposed strips of cotton move forwardly through the trough 2, the side portions of the lower, wider strip 28 will engage the beveled folders 43 and the latter will serve to fold said side portions of the strip over the narrow strip 29 and over each other so that the narrow non-absorbent strip will be inclosed within the wider strip of absorbent cotton, as clearly shown in Fig. 7. In order to retain the strips in this position after they have passed beyond the folders, a block 45 is located in the forward portion of the trough 2 and supported by a bracket 46 adjustably attached to one of the side bars 4 of said trough. The interfolded cotton strips will be fed forwardly from the trough 2 by the feed roller 8 and the apron 6 and projected into the trough 3 a sufficient distance to form a padding of proper length for one napkin, when it will be severed by the operation of the knife 9.

A roll 47 of cheese cloth or similar material is located under the trough 3 and the cloth from this roll passes rearwardly and then forwardly over the apron 13 which constitutes the bottom of the trough 3 and then forwardly between the aprons 25. Beveled folders 48 are located within the trough 3 and adjustably connected with the bars 11 of said trough by means of brackets 49. When the folded cotton strips are projected into the trough 3 and severed to form a pad for one napkin, said pad will be deposited upon the cloth as indicated at 50, Fig. 1 and as the cloth and pad move forwardly through the trough 3, said cloth will engage the beveled folders 48 and by them be folded over the pad thus forming an envelop for the latter. The folded cheese cloth containing the pad will move forwardly between the aprons 25 and will be severed by the operation of a cutter 26,—the proportions of the parts being such that the cheese cloth envelop will be severed appreciable distances in front of and in rear of each pad so as to form end portions for the napkin suitable for attachment to the clothing of the wearer or any suitable supporting means. After passing the cutter 26, the napkin will be carried by a suitable conveyer 51, preferably to a sewing machine where lines of stitching will be made transversely across the napkin at respective ends of the pad portion thereof.

In order to provide means for feeding the cheese cloth from the roll 47, a roller 52 is employed and provided with a pulley 53 to receive motion from a belt 54 and the latter derives motion from a pulley 55 on one of the forward feed rollers.

The cutting mechanism and the devices for controlling the operation of the feeding means are the same in construction at the forward ends of the respective troughs and a detailed description of one set of cutting devices and feed controlling mechanism (such as shown in Fig. 5 of the drawing) will suffice for both.

The cutter or knife (such as 9 or 26) is provided with an enlarged head 56 pivotally attached to an enlargement 57 at one end of a knife bar 58 with which said knife coöperates to make a shearing cut in severing the napkins and their pads. By providing the knife with a broad head having an extended bearing against the enlargement 57, I am enabled to make a clean cut and in order to further insure the proper cutting of the cotton, a spring 59 is attached at one end to the framework and at the other end to the knife so as to tend to pull the latter toward the knife bar 58 so as to cause it to operate closely thereto. A lever 60 is pivotally supported in the lower portion of the framework and the short arm of this lever is provided with a weight 61, while the free end of the longer arm of said lever is connected, by means of a rod or pitman 62 with the knife. A shaft 63 is mounted in suitable brackets on the framework and on this shaft an arm 64 is loosely mounted and provided at one end with a roller 65 to engage a cam 66 on the long arm of the lever 60 near the fulcrum of the latter. The other end of the arm 64 is provided with a notched lug 67 to engage a toothed wheel 68 keyed to the shaft 63 and said arm 64 is also provided with slots 69 to receive screws in the toothed wheel 68. The shaft 63 has secured thereto a gear wheel 70 which receives motion from a pinion 71 on a drive shaft 72 and the latter is provided with a pulley 73 for the reception of a strap 74 for transmitting motion to the drive shaft from any suitable source of power. From this construction and arrangement of parts, it will be seen that motion will be transmitted from the drive shaft 72 to the arm 64 and that the coöperation of the roller 65 on this arm, with cam 66 on the lever 60 will effect the operation of the knife 9 or 26. By adjusting the arm 64 on the shaft 63 of one of the cutter-operating mechanisms relatively to the arm 64 of the other cutter-operating mechanism, the operation of the two cutters (9 and 26) can be so timed relatively to each other as to cause the cutting of pads or napkins of different lengths.

The shaft 63 is provided with a beveled pinion 75 which transmits motion to a beveled pinion 76 on a shaft 77. The shaft 77 is provided with a sprocket wheel 78 from which motion is imparted by means of a sprocket chain 79 to a sprocket wheel 80 on the shaft 81. The shaft 81 carries a gear 82 which transmits motion to a pinion 83 on a stub shaft 84. A sprocket wheel 85 is also mounted on the stub-shaft 84 and over this sprocket wheel a chain 86 passes for transmitting motion to a sprocket wheel 87 on a stub-shaft 88. This stub-shaft also carries a pinion 89 which meshes with a pinion 90 on one journal of the feed roller 8 or 24 and thus motion is transmitted to the feeding mechanism of the cotton and cloth strips through the troughs.

It is important that the feeding mechanism above described shall be stopped while the cutting devices operate and for the purpose of temporarily stopping and then starting the operation of the feeding mechanism, the devices now to be described will be employed.

The sprocket wheel 80 is loosely mounted with a clutch member 91 upon the shaft 81 and the other member 92 of this clutch is rigidly secured to said shaft 81. A shaft 93 is mounted in the lower portion of the framework and provided with a sprocket wheel 94 which receives motion, by means of a sprocket chain 95, from a sprocket wheel 96 secured on the shaft 77. The shaft 93 also carries a cam wheel 97 and above this cam wheel, a lever 98 is pivotally supported between its ends by a bracket 99 secured to the framework. The lower end of this lever terminates in the path of the cam wheel 97 and its upper end is adapted to coöperate with the movable member 91 of the clutch for shifting the same. A spring 100 is attached at one end to the framework and at its other end is connected with the lower arm of the lever 98 so as to cause the loose clutch member 91 to engage the fixed clutch member 92. The cam wheel 97 is so constructed and timed that when the cutting mechanism begins to operate, said cam will actuate the lever 98 in opposition to the spring 100 and cause the clutch members to be separated and the transmission of motion to the feeding mechanism stopped. At the completion of the cutting operation, the cam wheel 97 will release the lever 98 and the spring 100 will operate to shift said lever and bring the clutch members to engagement with each other and thus again start the feeding mechanism.

Various slight changes might be made in the details of construction of my invention without departing from the spirit thereof or limiting its scope and hence I do not wish to restrict myself to the exact details herein set forth.

Having fully described my invention what I claim as new and desire to secure by Letters-Patent, is,—

1. In an apparatus for making sanitary napkins, the combination with devices for reducing two strips of material to different widths, conveying rolls and chutes for delivering the narrow strip upon the wider strip, and means for folding the sides of the wider strip over the narrow strip, substantially as set forth.

2. In an apparatus for making sanitary napkins, the combination with devices for reducing two strips of material to different widths, conveying rolls and chutes for delivering the narrower strip upon the wider strip, means for folding the sides of the wider strip over the narrower strip and the sides over each other, and a cutter and actuating mechanism for automatically cutting the folded strips into desired lengths, substantially as set forth.

3. In an apparatus for making sanitary napkins, the combination with devices for reducing two strips to different widths, conveying rolls and chutes for delivering the narrower strip upon the wider strip, means for folding the sides of the wider strip over the narrower strip and the sides over each other, a cutter and actuating mechanism for automatically severing the folded strip into desired lengths, of conveying rolls, guides and folders for automatically folding a third strip over said folded strip sections, substantially as set forth.

4. In apparatus of the character described, the combination with means for inclosing one cotton batting strip within another, of means for inclosing said cotton batting strips within a fabric strip, severing means for said strips, and common driving mechanism for all of said means.

5. In apparatus of the character described, the combination of means for inclosing one cotton batting strip within another, means for inclosing said cotton batting strips within a fabric strip, severing means, driving mechanism common to all of said means, and means for timing the severing means.

6. In apparatus of the character described, the combination of means for inclosing one cotton batting strip within another, means for severing said strips into pads, means for inclosing said pads within a fabric strip, means for severing the fabric strip between the pads, operating mechanism for actuating the various means, and means for timing each of said severing means.

7. In apparatus for making sanitary napkins, the combination with two chutes, of means for feeding superimposed cotton batting strips through one of said chutes, means for simultaneously folding portions of one of said cotton strips over the other strip, severing means between the chutes, means in the second chute for folding a fabric strip over the severed cotton batting members or strip sections, means for feeding the fabric strip and cotton strip sections through the second chute, and means beyond the end of the second chute for severing the fabric strip between the cotton strip sections.

8. In apparatus of the character described, the combination with a frame, of a chute, means for feeding superimposed strips through the chute, beveled folders located within the chute at respective sides thereof for folding portions of one strip over the other strip, and means for adjustably supporting said folders and permitting their adjustment relatively to each other and lengthwise of the trough.

In testimony whereof, I have signed this specification in the presence of two subscribing witnesses.

MARTIN H. MARCUS.

Witnesses:
    ANNIE E. KENNY,
    ALBERT HOGAN.